United States Patent
Gohain et al.

(10) Patent No.: US 12,422,985 B2
(45) Date of Patent: Sep. 23, 2025

(54) WRITE QUALITY IN MEMORY SYSTEMS

(71) Applicant: Micron Technology, Inc., Boise, ID (US)

(72) Inventors: Nitul Gohain, Bangalore (IN); Giuseppe Cariello, Boise, ID (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 210 days.

(21) Appl. No.: 17/887,258

(22) Filed: Aug. 12, 2022

(65) Prior Publication Data
US 2024/0053895 A1 Feb. 15, 2024

(51) Int. Cl.
*G06F 3/06* (2006.01)
(52) U.S. Cl.
CPC .......... *G06F 3/0611* (2013.01); *G06F 3/0629* (2013.01); *G06F 3/0679* (2013.01)
(58) Field of Classification Search
CPC ..... G06F 3/0611; G06F 3/0629; G06F 3/0679
See application file for complete search history.

(56) References Cited

U.S. PATENT DOCUMENTS

| | | | |
|---|---|---|---|
| 9,432,443 B1* | 8/2016 | Herington | H04L 41/0813 |
| 2017/0315838 A1* | 11/2017 | Nidugala | H04L 43/0817 |
| 2020/0042207 A1* | 2/2020 | Kwak | G06F 3/0625 |
| 2022/0113987 A1* | 4/2022 | Parry-Barwick | G06F 21/629 |
| 2022/0229574 A1* | 7/2022 | Tanpairoj | G06F 3/0679 |
| 2022/0253340 A1* | 8/2022 | Sterbling | G06N 7/01 |

\* cited by examiner

*Primary Examiner* — Eric Cardwell
(74) *Attorney, Agent, or Firm* — Holland & Hart LLP

(57) ABSTRACT

Methods, systems, and devices for improving write quality in memory systems are described. The memory system may receive, from a host system, a command to perform an operation. The memory system may determine an availability parameter that indicates processing resources of the memory system that are available to perform the operation based on receiving the command. In some cases, the memory system may transmit, to the host system, a message comprising the availability parameter, and the host system may delay transmission of one or more pending commands based on receiving the message comprising the availability parameter.

15 Claims, 8 Drawing Sheets

WRITE QUALITY IN MEMORY SYSTEMS

FIELD OF TECHNOLOGY

The following relates to one or more systems for memory, including improving write quality in memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
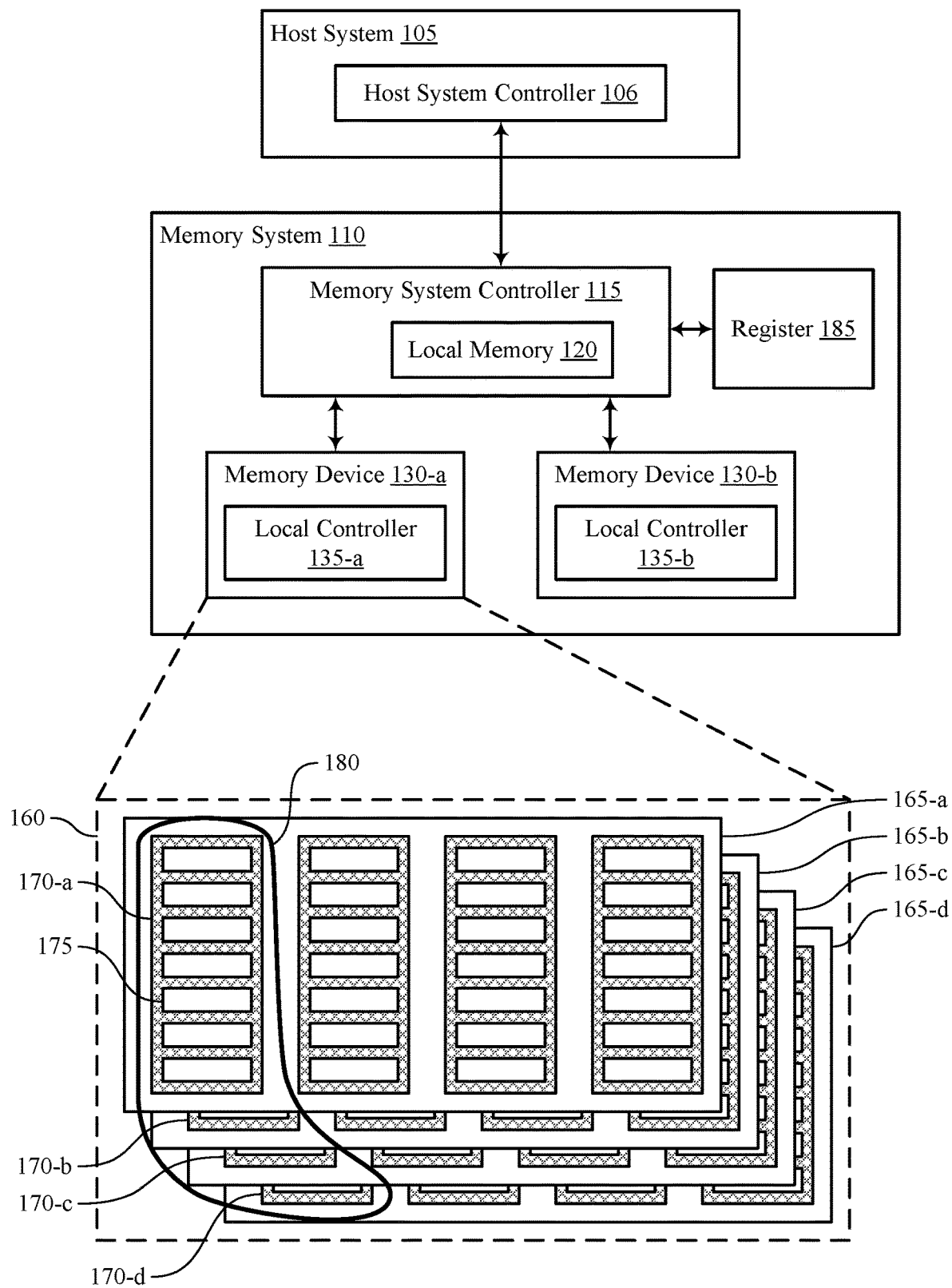
FIG. 1 illustrates an example of a system that supports improving write quality in memory systems in accordance with examples as disclosed herein.

A memory system, including a not-and (NAND) memory device, may be configured to store four bits of information as quad-level cells (QLCs). Access operation times for QLC data may be longer than data associated tri-level cells (TLCs) or other types of cells that store three or fewer bits of information. In some cases, the block size for QLC memory may be larger than TLC memory and other types of memory cells (e.g., because each memory cell stores more bits than other memory cells). In such cases, the QLC memory may experience difficultly in replacing bad blocks of data of the memory system. In some memory systems, blocks that include errors above a threshold, may be replaced by other redundant blocks. In QLC memory, the risk for errors may be higher (given the higher quantity of bits stored in a block). Thus, replacing an entire block for some quantities of errors may reduce a yield or performance of a memory system. In some cases, blocks may be ranked based on their reliability (e.g., error rate). Different blocks may be matched with different data as a way to avoid replacing a bad block.

To improve performance, the memory system may simultaneously perform foreground operations (e.g., read operations and write operations) and background operations (e.g., garbage collection) at a same time. In some examples, the concurrency of performing background and foreground operations may cause performance degradation on the memory system. Background operations may be an example of memory-initiated operations such as media scans, garbage collection procedures, error handling (e.g., uncorrectable error correction code (UECC) and/or bad block management), wear leveling, cache flushing, background wiping, or a combination thereof. Foreground operations may be an example of host-initiated operations such as write operations, read operations, refresh operations, erase operations, trim operations, or a combination thereof. For example, the memory system may perform background operations during host idle time, and in some cases, the memory system may experience an interruption in completing the background operations if a foreground operation command from the host system arrives at the memory system.

Based on the write pattern of the received command and/or idle time window to perform the background operation, the memory system may be unable to avoid exposure to low write performance, high read latency, or both which may decrease the efficiency of the memory system, thereby decreasing the overall performance of the memory system. For a QLC NAND device, the low write performance and high read latency may be emphasized (e.g., increased) due to a slower programming time for QLC memory, larger NAND block size, SLC cache architecture, or a combination thereof. The low write performance and high read latency may increase the risk of hacking and other compromises to the system as a whole, which may have a variety of consequences including theft of information from the system, failure of various sub-systems of the system, increasing the power consumption, decreasing the efficiency and start-up time of performing operations (e.g., a lag time for application start-up), and decreasing the overall performance of the memory system. Such cases may pose a threat to the security and safety of the memory system.

Systems, devices, and techniques are described to improve a write quality and reduce latency of the memory system, thereby improving the overall efficiency and operations of the memory system. In some memory systems, techniques for providing a real-time message to the host system upon determining an availability parameter are disclosed, thereby enabling the host system to plan the transmission of pending commands accordingly and improve the write quality to the application layer in a predictive manner. By using a feedback mechanism from the memory system to inform the host system how long the memory system may provide a good write quality of service, the host system may be able to delay the transmission of pending commands until the memory system completes background operations and is available to receive the commands, thereby improving the latency associated with the operations of the memory system.

In some examples, the memory system may receive, from the host system, a command to perform an operation. The memory system may determine an availability parameter that indicates processing resources of the memory system that are available to perform the operation based on receiving the command. In such cases, the memory system may transmit, to the host system, a message comprising the availability parameter in response to determining the availability parameter. The availability parameter may be an example of a percentage of bandwidth that the memory system is using to process the resources of the memory system. In some cases, the bandwidth may be an example of an amount of processing resources of the memory system. Determining an availability parameter and transmitting the availability parameter to the host system may increase the reliability and security of the memory system, thereby allowing the memory system or other components to perform operations at improved speeds, efficiency, and performance. In some cases, decreasing the latency may enable host application to be executed at improved speeds, efficiency, and performance.

Figure 2:
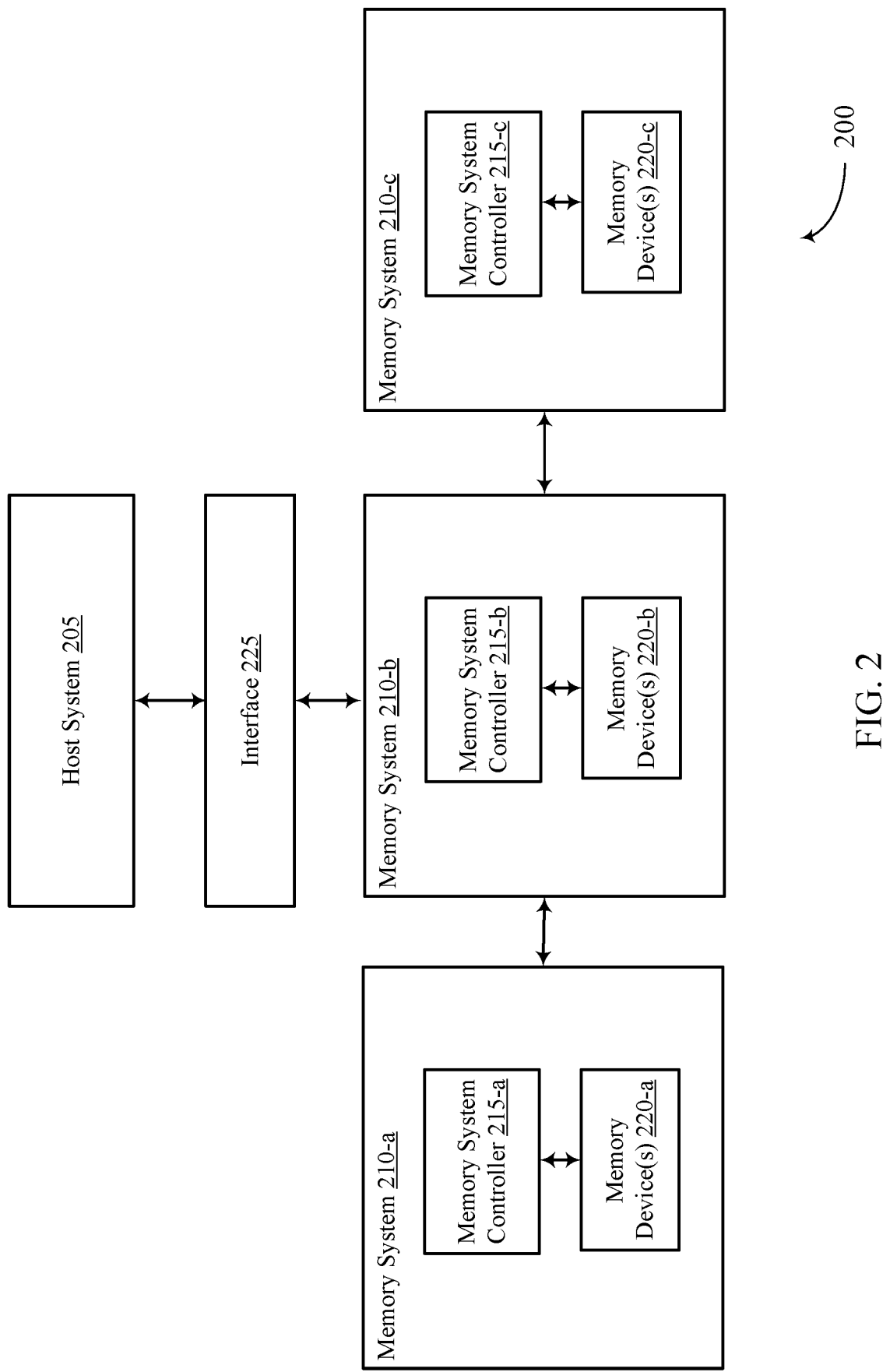
FIG. 2 illustrates an example of a system that supports improving write quality in memory systems in accordance with examples as disclosed herein.

Features of the disclosure are initially described in the context of systems with reference to FIGS. 1 through 2. Features of the disclosure are described in the context of flow diagrams with reference to FIGS. 3 through 4. These and other features of the disclosure are further illustrated by and described in the context of an apparatus diagram and flowchart that relate to improving write quality in memory systems with reference to FIGS. 5 through 8.

FIG. 1 illustrates an example of a system 100 that supports improving write quality in memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, the interface may be included in or otherwise supported between a host system controller 106 of the host system 105 and a memory system controller 115 of the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support improving write quality in memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system may include a register 185. In some cases, the register 185 may store an indication (e.g., first indication) of the availability parameter of the memory system 110. In such cases, the memory system 110 may set the first indication of the availability parameter of the memory system 110 in the register 185. In some examples, the register 185 may store an indication of a health status of the memory system 110. The register 185 may be associated with event alerts of the memory system 110. In some cases, the register 185 may be coupled with and communicate with the memory system controller 115. The register 185 may be accessible by the host system 105 such that information in the register 185 may be read by both the host system 105 and the memory system 110. In some cases, the register 185 can be written to by the host system 105, the memory system 110, or both.

In some cases, the system 100 may include a single QLC device (e.g., single memory system 110). The QLC UFS device may include the memory system controller 115 and a shared memory. In such cases, the host system 105 may directly communicate with the memory system 110 without the use of an interface. In some cases, the host system 105 may communicate with the memory system 110 via an interface. In some systems, the memory system 110 (e.g., including NAND devices) may be configured to store bits of information as QLC at higher densities. In such cases, the time to complete access operations for QLC data may be longer than TLC data or other types of data. Additionally, the block size for QLC memory may be larger than other types of memory due to a higher data density and/or a higher quantity of cells in the block, thereby decreasing the efficiency and overall performance of the memory system 110 to replace bad blocks of data. In such cases, techniques may be desired to improve the write quality in memory systems 110 using a QLC UFS device.

In some examples, the memory system 110 may receive, from the host system 105, a command to perform an operation. The memory system 110 may determine an availability parameter that indicates processing resources of the memory system 110 that are available to perform the operation in response to receiving the command. The memory system 110 may transmit, to the host system 105, a message comprising the availability parameter based on determining the availability parameter. The availability parameter may be an example of a score that indicates a size (e.g., an amount of data) of outstanding work to be completed for background operations. For example, the memory system 110 may determine a score that includes a percent busy score that may drop to 0% if the background operations are complete. In such cases, the availability parameter may indicate that the background operations include no outstanding work, and that 100% of the processing resources of the memory system 110 are available to perform the operation. In some examples, the availability parameter may be reported to the host system 105 to indicate an amount of host bandwidth available to the host system 105 versus an amount of host bandwidth that is consumed by the memory system 110. By determining the availability parameter and transmitting the message including the availability parameter to the host system 105, the memory system 110 may experience increased processing times, an increased efficiency performing background operations, and increased overall performance of the memory system 110.

FIG. 2 illustrates an example of a system 200 that supports improving write quality in memory systems in accordance with examples as disclosed herein. The system 200 includes a host system 205 coupled with one or more memory systems 210, which may be respective examples of a host system 105 and memory system 110 as described in reference to FIG. 1. The memory systems 210 may each include a memory system controller 215 and one or more memory devices 220, which may be respective examples of a memory system controller 115 and memory devices 130 as described in reference to FIG. 1.

The memory systems 210 may each be an example a QLC NAND system. For example, each memory system 210 may include a register and a shared memory, which may be respective examples of a register 185 as described in reference to FIG. 1. In such cases, the system 200 may include multiple QLC NAND UFS devices (e.g., memory systems 210). For example, a single device with a single UFS interface (e.g., interface 225) may be configured to include the multiple QLC NAND UFS devices. In such cases, each QLC NAND UFS device (e.g., memory system 210) may include the memory system controller 215 and a shared memory (e.g., SRAM) such that the system 200 may include multiple memory system controllers 215 and multiple SRAMs.

In some cases, the system 200 may include an interface 225 coupled with the host system 205 and the memory system 210-b. In such cases, the host system 205 may communicate with the memory systems 210 via the interface 225. For example, the host system 205 may communicate with the memory system 210-b via the interface 225 and the interface 225 may relay the information to an appropriate memory system (e.g., memory system 210-a, memory system 210-b, or memory system 210-c). Communication between the host system 205 and the memory system 210-b via the interface 225 may be an example of direct communication. The host system 205 may communicate with the memory system 210-a and memory system 210-c via memory system 210-b. Communication between the host system 205 and the memory system 210-a and memory system 210-c via the memory system 210-b may be an example of indirect communication.

In some examples, the system 200 may include more than one interface 225 coupled with the host system 205. In such cases, the host system 205 may communicate with the memory systems 210 via the multiple interfaces 225. For example, the host system 205 may communicate with the memory system 210-a via a first interface 225, the host system 205 may communicate with the memory system 210-b via a second interface 225, and the host system 205 may communicate with the memory system 210-c via a third interface 225. In such cases, the host system 205 may communicate with each memory system 210 individually via a separate interface 225 that is associated with each memory system 210. The host system 205 may directly communicate with each memory system 210 via the respective interface 225.

To achieve continuous improved write performance for applications or improved sequence of write performance, more than one memory system 210 may be utilized where the host system 205 may switch between memory systems 210 which have completed background operations if another memory system 210 has entered a high background operation state (e.g., is performing background operations that use a significant amount of processing resources). For example, memory system 210-a may complete background operations while memory system 210-b, memory system 210-c, or both receives commands from the host system 205, thereby increasing coverage and efficiency of the system 200. In some cases, the write applications that consume more resources and bandwidth of the memory systems 210 may be directed to a memory system 210 operating in a maintenance mode (e.g., performing background operations), while higher priority applications may be directed to the other memory system 210, which may be given enough time to recover from garbage collection procedures and/or a folding state (e.g., are not performing background operations).

The memory systems 210 may utilize a score-based mechanism to communicate the availability parameter to the host system 205. The availability parameter may indicate a duration of time that a degraded performance of the memory system 210 may be expected while the memory system 210 performs background operations. In one example, the system 200 may determine that memory system 210-b is experiencing degraded performance (e.g., indicated via the determined availability parameter), and the memory system 210-b may identify memory system 210-a, memory system 210-c, or both to receive a command from the host system 205. In such cases, the host system 205 may receive an indication of the availability parameter and pre-emptively switch memory systems 210 such that the application layer may not be exposed to the delay of the degraded performance. The host system 205 may transmit the command (e.g., a redirected active write operation) to memory system 210-a, memory system 210-c, or both in response to determining the high latency associated with the memory system 210-*b*. In such cases, the host system 205 may switch between memory systems 210 based on feedback from the memory systems 210 (e.g., the message indicating the availability parameter).

For example, the host system 205 may be notified of the high latency associated with a write operation at a first memory system 210 and may redirect the active write operations to other memory systems 210 coupled with the host system 205. If the first memory system 210 experiences degradation, the host system 205 may change to other memory systems 210 to allow the first memory system 210 experiencing degradation to recover in idle mode from the high maintenance state (e.g., performing background operations). In one example, the host system 205 may write to memory system 210-*a* and if the host system 205 identifies a delay associated with the write operation, then the host system 205 may redirect the write command to memory system 210-*b*, memory system 210-*c*, or both and switch devices to perform the write operation. In some examples, a first memory system 210 may be deactivated (e.g., turned off) while the other memory systems 210 may be activated (e.g., turned on). The system 200 may switch between activated memory systems 210 to improve the efficiency and performance of the overall system 200 and avoid use of the first memory system 210 until the first memory system 210 is activated.

In such cases, the host system 205 may be coupled with two or more memory systems 210 to maintain a consistent low latency for the write operations. The threshold at which the host system 205 may switch between memory systems 210 may be configurable based on the peak latency that the host applications may tolerate. Multiple memory systems 210 may collaborate with each other and/or the host system 205, and the host system 205 may distribute commands across the set of memory systems 210 to improve host performance. In some cases, LBA addressing of an individual memory system 210 may be translated by a software layer to provide uniform LBA addressing for the storage device including each memory system 210. The operating system may use the device handle to write to a particular memory system 210, and the software may store mapping information on which memory system 210 the LBA is stored.

The memory systems 210 may indicate through the feedback mechanism which memory systems 210 are available and how many memory systems 210 may be utilized. For example, the memory system 210-*b* may indicate to the host system 205 that a single device (e.g., memory system 210-*b*) may be able to meet SLC performance, two devices (e.g. memory system 210-*b* and memory system 210-*a*) may be able to meet SLC performance for 25% cache full, or three devices (e.g. memory system 210-*b*, memory system 210-*a*, and memory system 210-*c*) may be able to meet SLC performance for 50% cache full. In some cases, the memory system 210-*b* may indicate to the host system 205 that four devices may be able to meet SLC performance for 75% cache full, and five devices may be able to meet SLC performance for 100% cache full. The ability to meet SLC performance for 100% cache full may indicate that the memory systems 210 may be performing maintenance operations (e.g., garbage collection procedures, folding procedures, experiencing logical saturation, etc.).

In some cases, if the SLC cache is available for memory system 210-*a* (e.g., thereby indicating a low availability parameter and/or that the memory system 210-*a* is available), the host system 205 may transmit commands to the memory system 210-*a* and experience optimized host performance. However, if the SLC cache is full, becoming full, and/or that the data is moved to a QLC cache, the memory system 210-*a* may experience delays, and the host system 205 may redirect the write commands to memory system 210-*b*, memory system 210-*c*, or both. Memory system 210-*a* may not experience enough idle time to recover blocks of data such that movement of data from the SLC cache to QLC cache may not be completed during the idle time, thereby degrading host performance. In such cases, the memory system 210-*b*, memory system 210-*c*, or both may receive commands from the host system 205 based on memory system 210-*b*, memory system 210-*c*, or both not experiencing delays.

Figure 3:
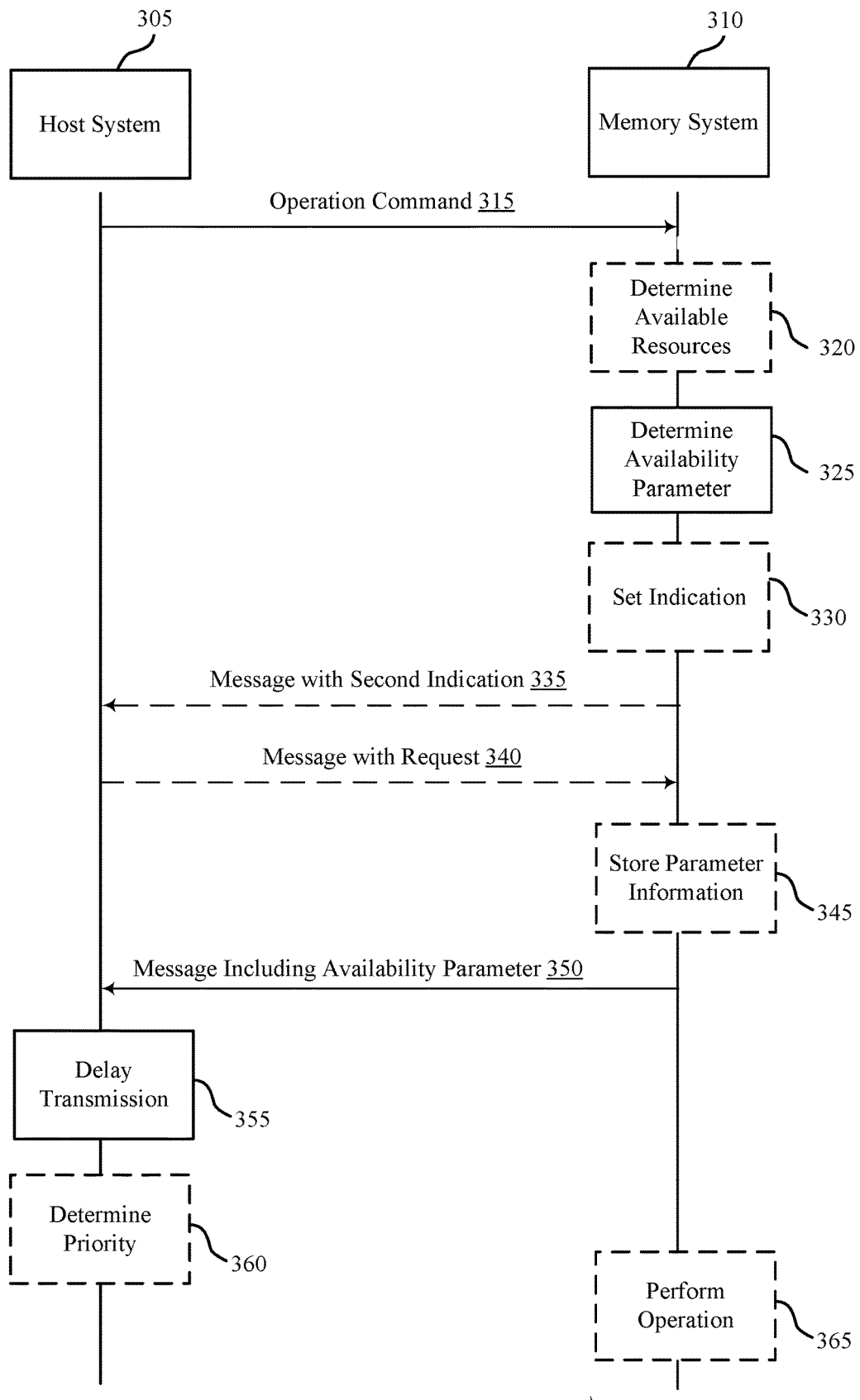
FIG. 3 illustrates an example of a flow diagram that supports improving write quality in memory systems in accordance with examples as disclosed herein.

FIG. 3 illustrates an example of a flow diagram 300 that supports improving write quality in memory systems in accordance with examples as disclosed herein. Flow diagram 300 may include host system 305 and memory system 310, which may be respective examples of a host system and memory system as described in reference to FIGS. 1 and 2. Alternative examples of the following may be implemented, where some steps are performed in a different order or not at all. Some steps may additionally include additional features not mentioned below. The flow diagram 300 illustrates techniques for using a single QLC UFS device (e.g., memory system 310) for prioritizing blocks and data.

Aspects of the flow diagram 300 may be implemented by a controller, among other components. Additionally or alternatively, aspects of the flow diagram 300 may be implemented as instructions stored in memory (e.g., firmware stored in a memory coupled with the memory system 310). For example, the instructions, if executed by a controller (e.g., the memory system controller 115), may cause the controller to perform the operations of the flow diagram 300.

In some cases, the memory system 310 may be unavailable for an extended period of time due to background operations performed by the memory system 310. In such cases, the host system 305 may experience delays, and the latency of the memory system 310 may increase. In some cases, the host system 305 may continuously transmit write commands while the memory system 310 is performing the background operations such that the memory system 310 does not experience enough idle time to recover blocks of data, thereby decreasing the efficiency of the memory system 310. In such cases, the memory system 310 may compute a busy score (e.g., an availability parameter) that indicates how busy the memory system 310 is with internal operations. The memory system 310 may report the busy score to the host system 305, and the host system 305 delay the transmission of pending commands such that the memory system 310 may return to full performance during the idle time (e.g., if no background operations are happening).

At 315, an operation command may be received. For example, the host system 305 may transmit the operation command, and the memory system 310 may receive the operation command prior to determining an availability parameter. In such cases, the memory system 310 may receive, from the host system 305, a command to perform an operation. In some cases, the operation may be an example of one or more host initiated operations, one or more memory system initiated operations, or a combination thereof. The one or more host initiated operations may include a read operation, a write operation, an erase operation, a refresh operation, a trim operation (e.g., an unmap operation), or a combination thereof. The one or more memory system initiated operations may include a garbage collection operation, a flush operation, an error handling operation, a wear leveling operation, or a combination thereof At 320, an amount of available resources may be determined. For example, the memory system 310 may determine an amount of available space to store data in a cache associated with writing to memory cells of the memory system 310 that store three or fewer bits of information based on receiving the command. The cache may be an example of a SLC cache, a MLC cache, or a TLC cache. In such cases, the memory system 310 may determine an amount of available space to store data in a cache associated with writing to SLCs, MLCs, or TLCs of the memory system 310. In some examples, the memory system 310 may determine whether processing resources are available to process commands.

At 325, an availability parameter may be determined. For example, the memory system 310 may determine an availability parameter that indicates processing resources of the memory system 310 that are available to perform the operation. The availability parameter may be determined in response to receiving the command. In some cases, the availability parameter may be determined based on determining the amount of available resources. The availability parameter may include a score that indicates a percentage of bandwidth that the memory system 310 has used to process incoming data that is stored in the memory system 310. For example, the score may indicate the percentage of bandwidth that the memory system 310 has used so far to process incoming data traffic (e.g., commands from the host system 305) where the incoming data may use storage space in the memory system.

For example, the memory system 310 may calculate the score (e.g., availability parameter) where the score may be an example of a percentage that indicates an amount of resources the memory system 310 has available to handle operations from the host system 305. For example, if the memory system 310 is performing background operations (e.g., memory system initiated operations) and the memory system 310 is unavailable to perform an operation sent from the host system 305, the availability parameter may indicate that the memory system is 100% unavailable (e.g., 100% busy). In other examples, if the memory system 310 is performing background operations and a portion of the memory system 310 is available to perform an operation sent from the host system 305, the availability parameter may indicate that the memory system is 90% unavailable (e.g., 90% busy) or 10% available. In such cases, the availability parameter may indicate that 10% of the shared memory is available to process and/or store resources. In some cases, the availability parameter may indicate a percentage of wear leveling, bad block management, background wipe operations, folding procedures, garbage collection pending operations, an estimated recovery time, or a combination thereof. In some examples, the availability parameter may indicate how much maintenance work is being done on the memory system 310 to indicate how much of the memory system 310 is available (e.g., not completing maintenance work). Maintenance work may be an example of background operations.

At 330, an indication may be set. For example, the memory system 310 may set, in a register associated with the memory system 310, a first indication of the availability parameter of the memory system based on determining the availability parameter. In such cases, the memory system 310 may set, in the register associated with the memory system 310, the first indication in response to determining the availability parameter. In some examples, the memory system 310 may set an event alert in a register. The first indication may be an example of an event alert bit. The event alert bit may indicate the background operation and a time to complete the background operation. For example, the memory system 310 may perform an exception event mechanism.

In some examples, the host system 305 may transmit, to the memory system 310, a request for an indication of a health status of the memory system 310 after transmitting the operation command. In such cases, the host system 305 may transmit a request for an indication of a health status prior to receiving a message of the availability parameter. In other examples, the host system 305 may transmit, to the memory system 310, a request for an indication of a health status of the memory system 310 in response to receiving a message of the availability parameter. The memory system 310 may set, in a register associated with the memory system 310, an indication of the health status of the memory system 310 based on determining the availability parameter. In some cases, the host system 305 may transmit a request for the indication of the health status to slow down the operations of the memory system 310. In such cases, the host system 305 may adjust the commands sent to the memory system 310. The host system 305 may transmit a request for a descriptor that indicates the health status of the memory system 310 in response to setting the indication.

At 335, a message may be transmitted. For example, the memory system 310 may transmit, to the host system 305, the message that includes the second indication that the register associated with the memory system has been changed based on setting a register. In such cases, the host system 305 may receive, from the memory system 310, the message that includes the second indication that a register associated with the memory system 310 has been changed based on receiving the message. In some cases, the host system 305 may receive, from the memory system 310, the indication of the health status of the memory system 310 based on transmitting the request to the memory system 310. In such cases, the second indication received at the host system 305 may include the indication of the health status. The indication of the health status may include the descriptor. For example, the memory system 310 may transmit the descriptor that indicates the health status of the memory system in response to setting the indication. In some cases, the memory system 310 may transmit the message in response to setting the indication. In such cases, the memory system 310 may transmit the message after setting the indication. In other examples, the memory system 310 may transmit the message before setting the indication.

At 340, a message with a request may be received. For example, the memory system 310 may receive, from a host system 305, a second message requesting the memory system 310 to transmit contents of the register associated with the memory system 310 to the host system 305. In such cases, the host system 305 may generate a second message and transmit the second message requesting the memory system 310 to transmit contents of the register associated with the memory system 310 to the host system 305 based on receiving the second indication.

At 345, parameter information may be stored. For example, the memory system 310 may store parameter information about an operation of the memory system 310 based on setting the first indication. In some cases, transmitting the second indication may be in response to storing the parameter information. In some cases, the memory system 310 may store parameter information about an operation of the memory system 310 before receiving a command from a host system 305. In such cases, storing the parameter information may occur before the memory system 310 executes the command. The memory system 310 may store the parameter information prior to transmitting the message with the second indication. In other examples, the memory system 310 may store the parameter information after transmitting the message with the second indication and/or receiving the message with the request.

At 350, a message including the availability parameter may be transmitted. For example, the memory system 310 may transmit, to the host system 305, a message including availability parameter in response to determining the availability parameter. The host system 305 may receive, from the memory system 310, the message including the availability parameter. In some cases, the message including the availability parameter may be an example of a third message that includes the contents of the register. For example, the memory system 310 may transmit, to the host system 305, a third message that includes the contents of the register based on receiving the second message requesting the memory system 310 to transmit contents of the register to the host system 305. In such cases, the host system 305 may receive the third message that includes the contents of the register.

The host system 305 may receive, from the memory system 310, a third message that includes the contents of the register based on transmitting the second message. In some cases, the message including the availability parameter may be transmitted based on transmitting the second indication. In some examples, transmitting the message including the availability parameter may be in response to receiving the second message. The host system 305 may use the information in the message (e.g., including the availability parameter) to determine whether to delay a transmission of commands to the memory system 310. In some cases, the host system 305 may receive the message and provide longer powered idle times to the memory system 310 to enable the memory system 310 to complete operations (e.g., background operations, maintenance work, or both).

At 355, a transmission of commands may be delayed. For example, the host system 305 may delay transmission of one or more pending commands in direct response to receiving the message including the availability parameter. In some cases, delaying the transmission may be based on determining the idle time. For example, the host system 305 may determine an idle time for performing the operation in response to receiving the message. In such cases, the host system 305 may slow down issuance of commands, extend the idle time, or both. By slowing down the command transmitted from the host system 305 to the memory system 310, the memory system 310 may experience increased idle time for the memory system 310 to recover from a high state (i.e., performing one or more background operations). Instead of the host system 305 continuously sending commands to the memory system 310, the host system 305 may halt (e.g., stop) or slow down the transmission of commands or transmit commands that may require a faster response (e.g., a higher priority command).

In some cases, the host system 305 may delay the transmission of commands based on receiving fewer responses from the memory system 310 or receiving responses of the memory system 310 at a slower rate. In such cases, the host system 305 may determine that the memory system 310 is unavailable and/or busy executing commands due to the decreased time, frequency, and rate of receiving responses. In some cases, the host system 305 may read the health report in response to receiving fewer responses to determine how much space is available in the memory system 310 to process the commands.

At 360, a priority of commands may be determined. For example, the host system 305 may determine a priority of each command of the one or more pending commands in direct response to receiving the message including the availability parameter. In some cases, delaying the transmission of the one or more pending commands may be based on determining the priority. The host system 305 may transmit a first pending command of the one or more pending commands after delaying the transmission in response to determining the priority. In such cases, the host system 305 may prioritize the pending commands and transmit the commands with a higher priority before transmitting commands with a lower priority. For example, if the availability parameter indicates that 10% of the memory system 310 is available to process resources, then the host system 305 may transmit a higher priority command (e.g., a critical write) and delay the lower priority commands (e.g., other writes).

At 365, the operation may be performed. For example, the memory system 310 may enter the idle time for performing the operation after transmitting the message including the availability parameter. The memory system may perform the operation during the idle time in response to entering the idle time. In some cases, the memory system 310 may receive, from the host system 305, a fourth message requesting that the memory system 310 perform the operation based on transmitting the third message (e.g., the message including the availability parameter). The host system 305 may generate the fourth message and transmit the fourth message requesting that the memory system 310 perform the operation based on receiving the third message.

Figure 4:
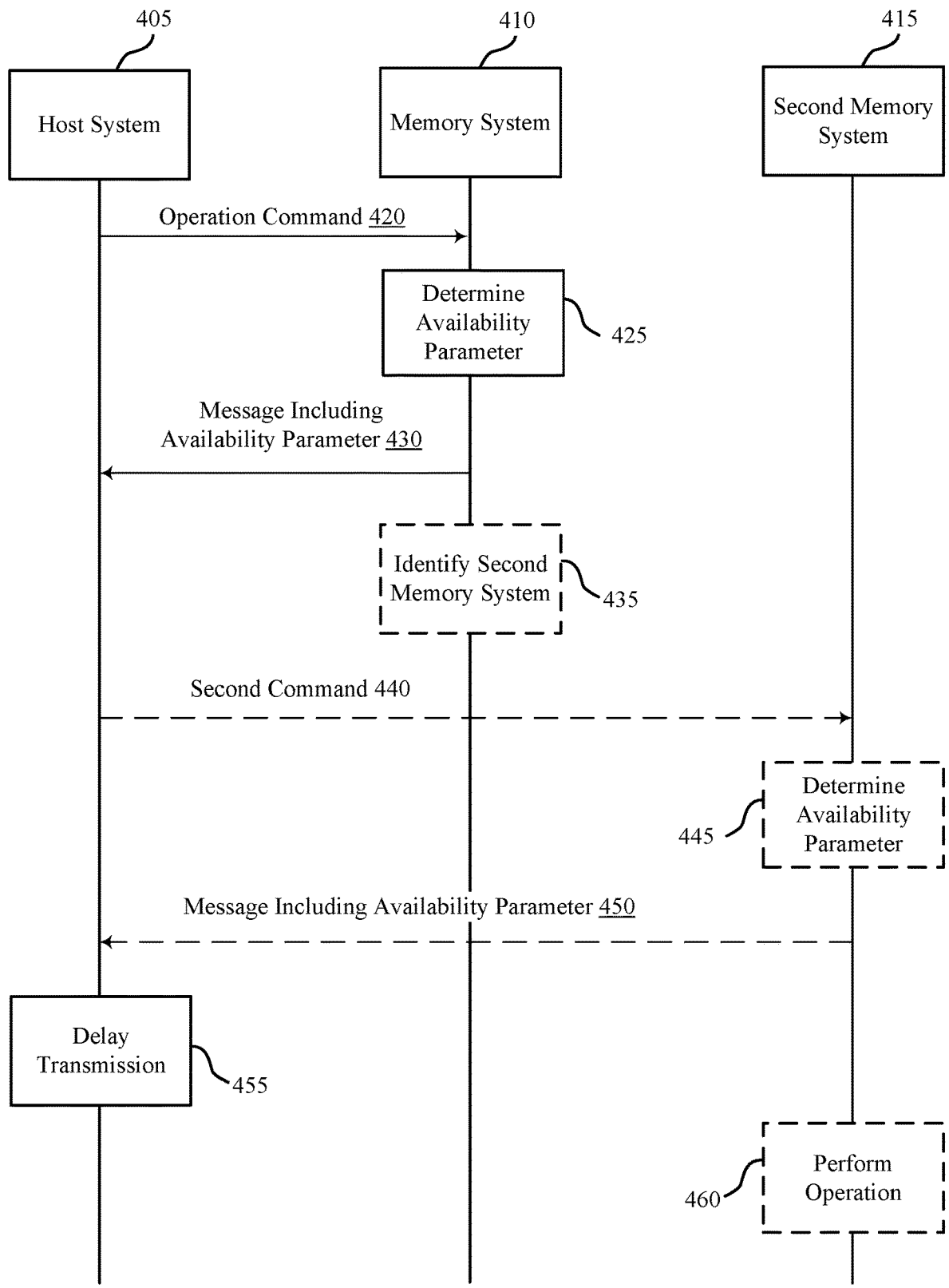
FIG. 4 illustrates an example of a flow diagram that supports improving write quality in memory systems in accordance with examples as disclosed herein.

FIG. 4 illustrates an example of a flow diagram 400 that supports improving write quality in memory systems in accordance with examples as disclosed herein. Flow diagram 400 may include host system 405, memory system 410, and second memory system 415 which may be respective examples of a host system and memory system as described in reference to FIGS. 1 through 3. Alternative examples of the following may be implemented, where some steps are performed in a different order or not at all. Some steps may additionally include additional features not mentioned below. The flow diagram 400 illustrates using multiple memory systems (e.g., memory system 410 and second memory system 415) for prioritizing blocks and data.

Aspects of the flow diagram 400 may be implemented by a controller, among other components. Additionally or alternatively, aspects of the flow diagram 400 may be implemented as instructions stored in memory (e.g., firmware stored in a memory coupled with the memory system 410). For example, the instructions, if executed by a controller (e.g., the memory system controller 115), may cause the controller to perform the operations of the flow diagram 400.

At 420, an operation command may be transmitted. For example, the host system 405 may transmit, to a memory system 410, a command to perform an operation. The memory system 410 may receive, from the host system 405, the command to perform the operation, as described with reference to FIG. 3.

At 425, an availability parameter may be determined. For example, the memory system 410 may determine the availability parameter that indicates processing resources of the memory system 410 that are available to perform the operation in response to receiving the command. The availability parameter may be an example of the availability parameter described with reference to FIGS. 1 through 3.

At 430, a message including the availability parameter may be transmitted. For example, the memory system 410 may transmit, to the host system 405, the message including the availability parameter in direct response to determining the availability parameter. In such cases, the host system 405 may receive, from the memory system 410, the message including the availability parameter that indicates processing resources of the memory system 410 that are available to perform the operation based on transmitting the command to the memory system 410. In such cases, the availability parameter may indicate that the memory system 410 includes processing resources that are unavailable to perform the operation. In such cases, the availability parameter may indicate that the memory system 410 may include multiple pending background operations to perform that the memory system 410 is unable to complete.

At 435, a second memory system 415 may be identified. For example, the memory system 410 may identify a second memory system 415 available to receive the command to perform the operation in response to determining the availability parameter. In some cases, the second memory system 415 may be identified in response to transmitting the message to the host system 405. In other examples, the memory system 410 may identify the second memory system 415 prior to transmitting the message to the host system 405.

The memory system 410 may be avoided for host-initiated write operations so that the memory system 410 may perform the background operations. In such cases, a second memory system 415 may be used to perform the operation based on the memory system 410 being unavailable. In some cases, the memory systems may be rotated to perform host-initiated operations based on a schedule and/or in accordance with the techniques described with reference to FIG. 2.

For example, memory system 410 may perform active host write operations while second memory system 415 may perform ongoing background operations. The second memory system 415 may then switch to perform active host write operations while memory system 410 may perform ongoing background operations. In such cases, the memory system 410 and the second memory system 415 may be rotated to perform the host write operations (e.g., host-initiated operations) based on a schedule.

In other examples, memory system 410 may perform active host write operations while second memory system 415 and a third memory system may each perform ongoing background operations. The second memory system 415 may switch to perform the active host write operations while memory system 410 and the third memory system each perform ongoing background operations. The third memory system may then switch to perform the active host write operations while the memory system 410 and the second memory system 415 may each perform ongoing background operations. In such cases, multiple device (e.g., memory systems) may collaborate with each other and/or the host system 405 such that the host system 405 may spread work across the set of devices based on how much availability any device may have at any given time to improve host performance. A system may include any quantity of memory systems that may rotate between performing host operations and background operations (e.g., two, three, four, five, six, seven, eight memory systems).

At 440, a second command may be transmitted to the second memory system 415. For example, the host system 405 may transmit, to the second memory system 415, the command to perform the operation based on receiving the message. In some cases, the host system 405 may transmit the command in response to the memory system 410 identifying the second memory system 415. The second memory system 415 may receive, from the host system 405, the second command to perform the operation at the second memory system 415 in response to identifying the second memory system 415.

At 445, an availability parameter may be determined. For example, the second memory system 415 may determine a second availability parameter that indicates processing resources of the second memory system 415 that are available to perform the operation based on receiving the command (e.g., the second command). The second availability parameter may be an example of the availability parameter described with reference to FIGS. 1-3. In some cases, the second memory system 415 may perform the exception event mechanism, the health status check, or both in response to determining the second availability parameter. The exception event mechanism and the health status check may be an example of the exception event mechanism and the health status check as described with reference to FIG. 3.

At 450, a message including the second availability parameter may be transmitted. For example, the second memory system 415 may transmit, to the host system 405, the message including the second availability parameter in response to determining the second availability parameter. In such cases, the host system 405 may receive, from the second memory system 415, a second message including the second availability parameter that indicates processing resources of the second memory system 415 that are available to perform the operation.

At 455, transmission of commands may be delayed. For example, the host system 405 may delay transmission of one or more pending commands in response to receiving the second message including the second availability parameter. In some cases, the host system 405 may determining an idle time for performing the operation based on receiving the second message. In such cases, delaying the transmission may be in response to determining the idle time.

At 460, an operation may be performed. For example, the second memory system 415 may enter an idle time for performing the operation in response to transmitting the second message including the second availability parameter. The second memory system 415 may perform the operation during the idle time in direct response to entering the idle time.

Figure 5:
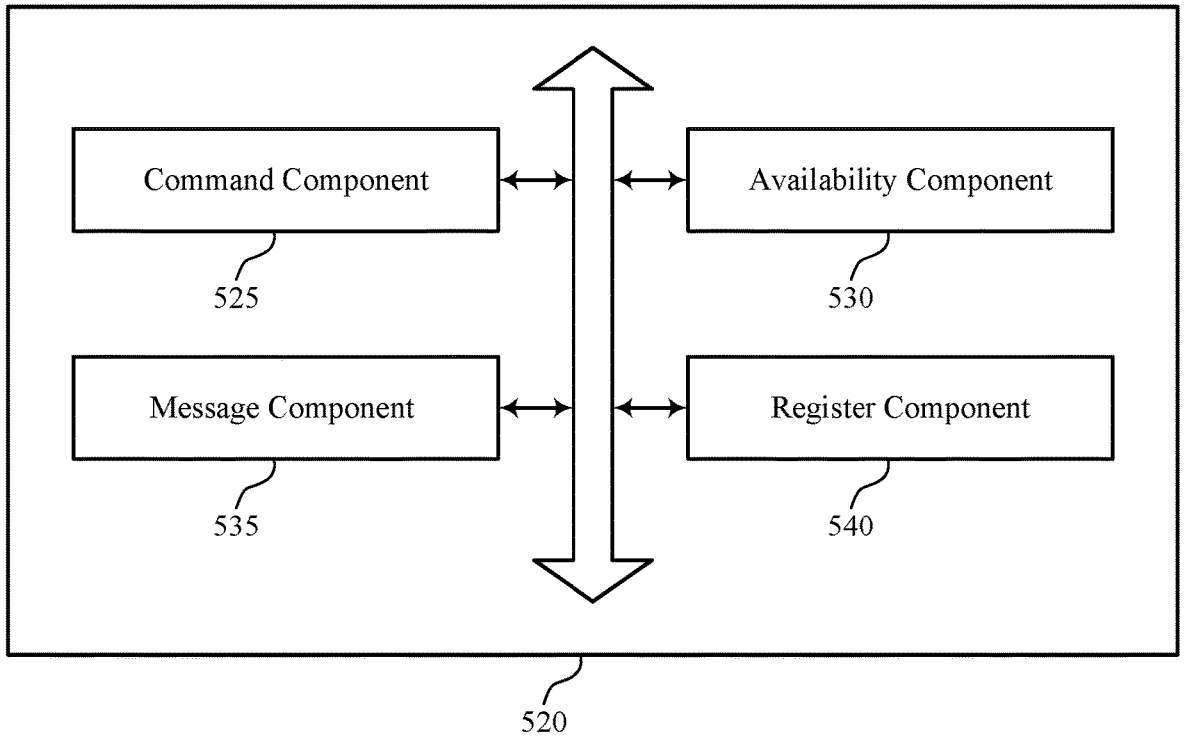
FIG. 5 shows a block diagram of a memory system that supports improving write quality in memory systems in accordance with examples as disclosed herein.

FIG. 5 shows a block diagram 500 of a memory system 520 that supports improving write quality in memory systems in accordance with examples as disclosed herein. The memory system 520 may be an example of aspects of a memory system as described with reference to FIGS. 1 through 4. The memory system 520, or various components thereof, may be an example of means for performing various aspects of improving write quality in memory systems as described herein. For example, the memory system 520 may include a command component 525, an availability component 530, a message component 535, a register component 540, or any combination thereof. Each of these components may communicate, directly or indirectly, with one another (e.g., via one or more buses).

The command component 525 may be configured as or otherwise support a means for receiving, from a host system, a command to perform an operation. The availability component 530 may be configured as or otherwise support a means for determining an availability parameter that indicates processing resources of the memory system that are available to perform the operation based at least in part on receiving the command. The message component 535 may be configured as or otherwise support a means for transmitting, to the host system, a message including the availability parameter based at least in part on determining the availability parameter.

In some examples, the availability component 530 may be configured as or otherwise support a means for determining an amount of available space to store data in a cache associated with writing to memory cells of the memory system that store three or fewer bits of information based at least in part on receiving the command, where determining the availability parameter is based at least in part on determining the amount of available space.

In some examples, the availability parameter includes a score that indicates a percentage of bandwidth that the memory system has used to process incoming data that is stored in the memory system.

In some examples, the availability component 530 may be configured as or otherwise support a means for identifying a second memory system available to receive the command to perform the operation based at least in part on determining the availability parameter. In some examples, the command component 525 may be configured as or otherwise support a means for receiving, from the host system, a second command to perform the operation at the second memory system based at least in part on identifying the second memory system.

In some examples, the availability component 530 may be configured as or otherwise support a means for determining a second availability parameter that indicates processing resources of the second memory system that are available to perform the operation based at least in part on receiving the command. In some examples, the message component 535 may be configured as or otherwise support a means for transmitting, to the host system, a second message including the second availability parameter based at least in part on determining the second availability parameter, where receiving the second command is based at least in part on transmitting the second message.

In some examples, the register component 540 may be configured as or otherwise support a means for setting, in a register associated with the memory system, a first indication of the availability parameter of the memory system based at least in part on determining the availability parameter. In some examples, the register component 540 may be configured as or otherwise support a means for transmitting a second indication that the register associated with the memory system has been changed based at least in part on setting the register, where transmitting the message is based at least in part on transmitting the second indication.

In some examples, the register component 540 may be configured as or otherwise support a means for storing parameter information about the operation of the memory system based at least in part on setting the first indication, where transmitting the second indication is based at least in part on storing the parameter information.

In some examples, the message component 535 may be configured as or otherwise support a means for receiving, from a host system, a second message requesting the memory system transmit contents of the register associated with the memory system to the host system, where transmitting the message including the availability parameter is based at least in part on receiving the second message.

In some examples, to support transmitting the message, the message component 535 may be configured as or otherwise support a means for transmitting, to the host system, a third message that includes the contents of the register based at least in part on receiving the second message.

In some examples, the register component 540 may be configured as or otherwise support a means for setting, in a register associated with the memory system, an indication of a health status of the memory system based at least in part on determining the availability parameter, where transmitting the message further includes transmitting a descriptor that indicates the health status of the memory system based at least in part on setting the indication.

In some examples, the command component 525 may be configured as or otherwise support a means for entering an idle time for performing the operation based at least in part on transmitting the message including the availability parameter. In some examples, the command component 525 may be configured as or otherwise support a means for performing the operation during the idle time based at least in part on entering the idle time.

In some examples, a system includes the memory system configured to manage memory-initiated operations and a second memory system configured to manage memory-initiated operations.

In some examples, the operation includes one or more host initiated operations, one or more memory system initiated operations, or a combination thereof. In some examples, the one or more host initiated operations include a read operation, a write operation, an erase operation, a trim operation, or a combination thereof. In some examples, the one or more memory system initiated operations includes a garbage collection operation, a flush operation, an error handling operation, a wear leveling operation, or a combination thereof.

Figure 6:
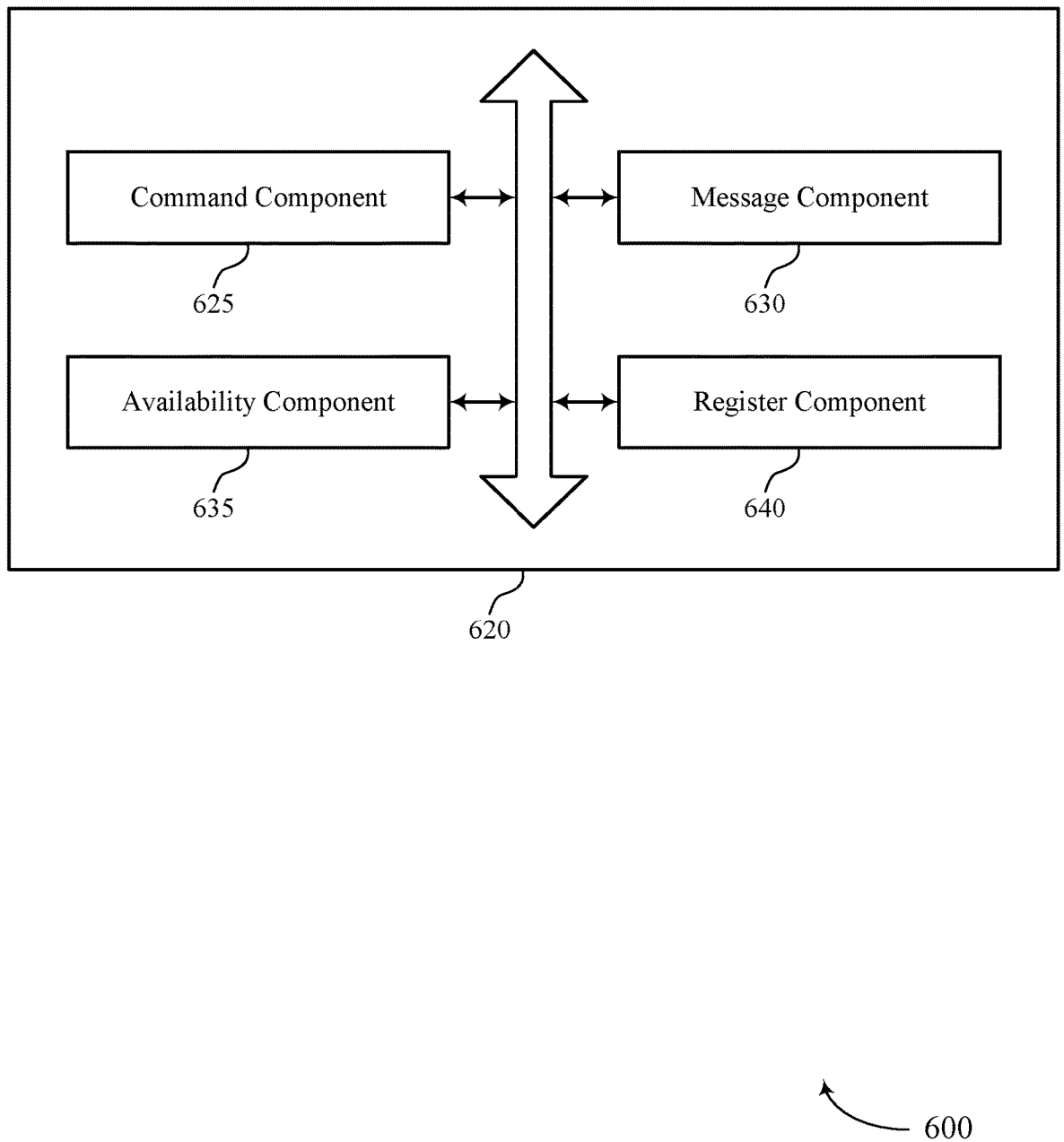
FIG. 6 shows a block diagram of a host system that supports improving write quality in memory systems in accordance with examples as disclosed herein.

FIG. 6 shows a block diagram 600 of a host system 620 that supports improving write quality in memory systems in accordance with examples as disclosed herein. The host system 620 may be an example of aspects of a host system as described with reference to FIGS. 1 through 5. The host system 620, or various components thereof, may be an example of means for performing various aspects of improving write quality in memory systems as described herein. For example, the host system 620 may include a command component 625, a message component 630, an availability component 635, a register component 640, or any combination thereof. Each of these components may communicate, directly or indirectly, with one another (e.g., via one or more buses).

The command component 625 may be configured as or otherwise support a means for transmitting, to a memory system, a command to perform an operation. The message component 630 may be configured as or otherwise support a means for receiving, from the memory system, a message including an availability parameter that indicates processing resources of the memory system that are available to perform the operation based at least in part on transmitting the command. The availability component 635 may be configured as or otherwise support a means for delaying transmission of one or more pending commands based at least in part on receiving the message including the availability parameter.

In some examples, the command component 625 may be configured as or otherwise support a means for determining a priority of each command of the one or more pending commands based at least in part on receiving the message, where delaying the transmission of the one or more pending commands is based at least in part on determining the priority. In some examples, the command component 625 may be configured as or otherwise support a means for transmitting a first pending command of the one or more pending commands after delaying the transmission based at least in part on determining the priority.

In some examples, the availability parameter includes a score that indicates a percentage of bandwidth that the memory system has used to process incoming data that is stored in the memory system.

In some examples, the command component 625 may be configured as or otherwise support a means for transmitting, from the host system and to a second memory system, the command to perform the operation based at least in part on receiving the message. In some examples, the message component 630 may be configured as or otherwise support a means for receiving, from the second memory system, a second message including a second availability parameter of the second memory system based at least in part on transmitting the command.

In some examples, the register component 640 may be configured as or otherwise support a means for receiving, from the memory system, a second indication that a register associated with the memory system has been changed based at least in part on receiving the message.

In some examples, the message component 630 may be configured as or otherwise support a means for transmitting, to the memory system, a second message requesting the memory system to transmit contents of the register associated with the memory system to the host system based at least in part on receiving the second indication.

In some examples, the message component 630 may be configured as or otherwise support a means for receiving, from the memory system, a third message that includes the contents of the register based at least in part on transmitting the second message.

In some examples, the register component 640 may be configured as or otherwise support a means for transmitting, to the memory system, a request for an indication of a health status of the memory system based at least in part on receiving the message. In some examples, the register component 640 may be configured as or otherwise support a means for receiving, from the memory system, the indication of the health status of the memory system based at least in part on transmitting the request.

In some examples, the command component 625 may be configured as or otherwise support a means for determining an idle time for performing the operation based at least in part on receiving the message, where delaying the transmission is based at least in part on determining the idle time.

Figure 7:
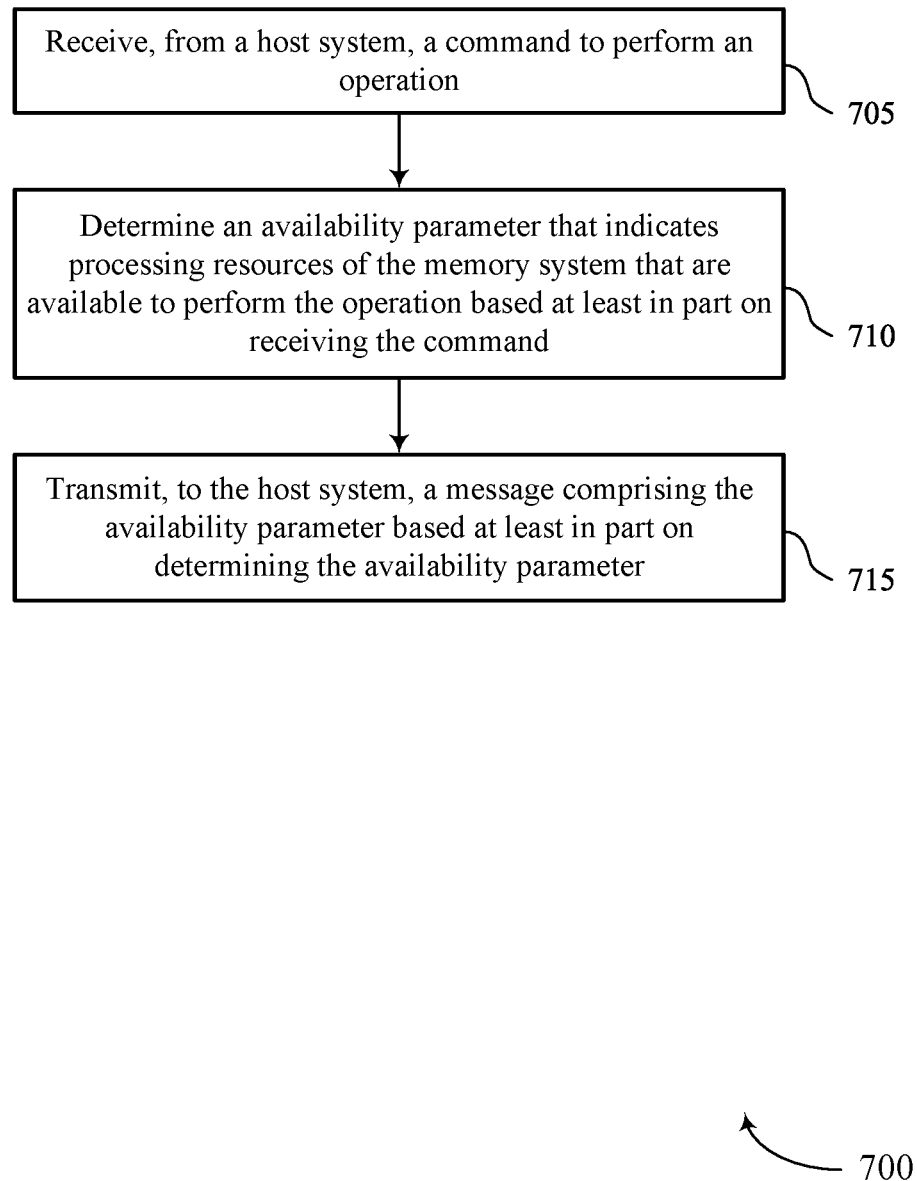
FIGS. 7 and 8 show flowcharts illustrating a method or methods that support improving write quality in memory systems in accordance with examples as disclosed herein.

FIG. 7 shows a flowchart illustrating a method 700 that supports improving write quality in memory systems in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving, from a host system, a command to perform an operation. The operations of 705 may be performed in accordance with examples as disclosed herein. In some examples, aspects of the operations of 705 may be performed by a command component 525 as described with reference to FIG. 5.

At 710, the method may include determining an availability parameter that indicates processing resources of the memory system that are available to perform the operation based at least in part on receiving the command. The operations of 710 may be performed in accordance with examples as disclosed herein. In some examples, aspects of the operations of 710 may be performed by an availability component 530 as described with reference to FIG. 5.

At 715, the method may include transmitting, to the host system, a message including the availability parameter based at least in part on determining the availability parameter. The operations of 715 may be performed in accordance with examples as disclosed herein. In some examples, aspects of the operations of 715 may be performed by a message component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host system, a command to perform an operation; determining an availability parameter that indicates processing resources of the memory system that are available to perform the operation based at least in part on receiving the command; and transmitting, to the host system, a message including the availability parameter based at least in part on determining the availability parameter.

Aspect 2: The method, apparatus, or non-transitory computer-readable medium of aspect 1, further including operations, features, circuitry, logic, means, or instructions, or any combination thereof for determining an amount of available space to store data in a cache associated with writing to memory cells of the memory system that store three or fewer bits of information based at least in part on receiving the command, where determining the availability parameter is based at least in part on determining the amount of available space.

Aspect 3: The method, apparatus, or non-transitory computer-readable medium of any of aspects 1 through 2, where the availability parameter includes a score that indicates a percentage of bandwidth that the memory system has used to process incoming data that is stored in the memory system.

Aspect 4: The method, apparatus, or non-transitory computer-readable medium of any of aspects 1 through 3, further including operations, features, circuitry, logic, means, or instructions, or any combination thereof for identifying a second memory system available to receive the command to perform the operation based at least in part on determining the availability parameter and receiving, from the host system, a second command to perform the operation at the second memory system based at least in part on identifying the second memory system.

Aspect 5: The method, apparatus, or non-transitory computer-readable medium of aspect 4, further including operations, features, circuitry, logic, means, or instructions, or any combination thereof for determining a second availability parameter that indicates processing resources of the second memory system that are available to perform the operation based at least in part on receiving the command and transmitting, to the host system, a second message including the second availability parameter based at least in part on determining the second availability parameter, where receiving the second command is based at least in part on transmitting the second message.

Aspect 6: The method, apparatus, or non-transitory computer-readable medium of any of aspects 1 through 5, further including operations, features, circuitry, logic, means, or instructions, or any combination thereof for setting, in a register associated with the memory system, a first indication of the availability parameter of the memory system based at least in part on determining the availability parameter and transmitting a second indication that the register associated with the memory system has been changed based at least in part on setting the register, where transmitting the message is based at least in part on transmitting the second indication.

Aspect 7: The method, apparatus, or non-transitory computer-readable medium of aspect 6, further including operations, features, circuitry, logic, means, or instructions, or any combination thereof for storing parameter information about the operation of the memory system based at least in part on setting the first indication, where transmitting the second indication is based at least in part on storing the parameter information.

Aspect 8: The method, apparatus, or non-transitory computer-readable medium of any of aspects 6 through 7, further including operations, features, circuitry, logic, means, or instructions, or any combination thereof for receiving, from a host system, a second message requesting the memory system transmit contents of the register associated with the memory system to the host system, where transmitting the message including the availability parameter is based at least in part on receiving the second message.

Aspect 9: The method, apparatus, or non-transitory computer-readable medium of aspect 8, where transmitting the message further includes operations, features, circuitry, logic, means, or instructions, or any combination thereof for transmitting, to the host system, a third message that includes the contents of the register based at least in part on receiving the second message.

Aspect 10: The method, apparatus, or non-transitory computer-readable medium of any of aspects 1 through 9, further including operations, features, circuitry, logic, means, or instructions, or any combination thereof for setting, in a register associated with the memory system, an indication of a health status of the memory system based at least in part on determining the availability parameter, where transmitting the message further includes transmitting a descriptor that indicates the health status of the memory system based at least in part on setting the indication.

Aspect 11: The method, apparatus, or non-transitory computer-readable medium of any of aspects 1 through 10, further including operations, features, circuitry, logic, means, or instructions, or any combination thereof for entering an idle time for performing the operation based at least in part on transmitting the message including the availability parameter and performing the operation during the idle time based at least in part on entering the idle time.

Aspect 12: The method, apparatus, or non-transitory computer-readable medium of any of aspects 1 through 11, where a system includes the memory system configured to manage memory-initiated operations and a second memory system configured to manage memory-initiated operations.

Aspect 13: The method, apparatus, or non-transitory computer-readable medium of any of aspects 1 through 12, where the operation includes one or more host initiated operations, one or more memory system initiated operations, or a combination thereof; the one or more host initiated operations include a read operation, a write operation, an erase operation, a trim operation, or a combination thereof; and the one or more memory system initiated operations includes a garbage collection operation, a flush operation, an error handling operation, a wear leveling operation, or a combination thereof.

Figure 8:
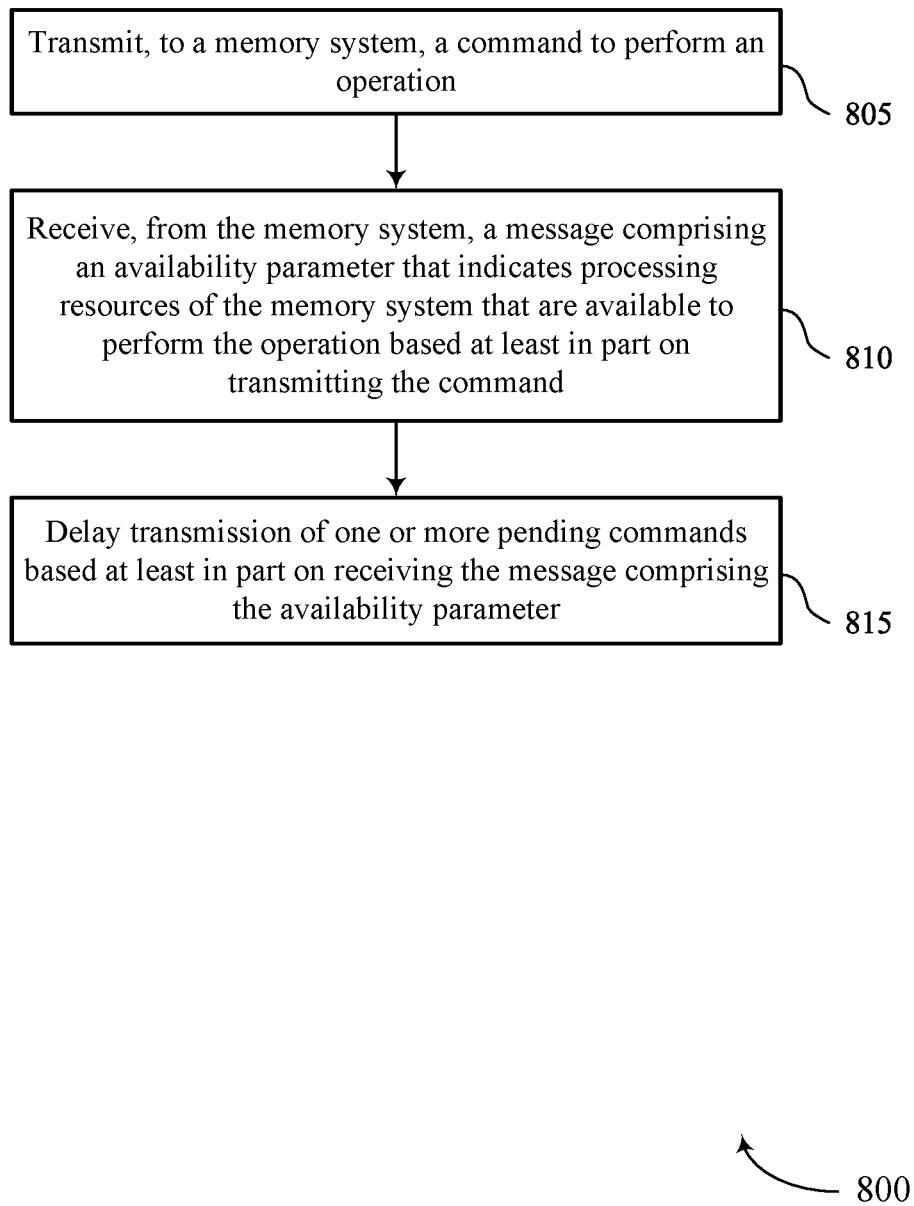

FIG. 8 shows a flowchart illustrating a method 800 that supports improving write quality in memory systems in accordance with examples as disclosed herein. The operations of method 800 may be implemented by a host system or its components as described herein. For example, the operations of method 800 may be performed by a host system as described with reference to FIGS. 1 through 6. In some examples, a host system may execute a set of instructions to control the functional elements of the device to perform the described functions. Additionally, or alternatively, the host system may perform aspects of the described functions using special-purpose hardware.

At 805, the method may include transmitting, to a memory system, a command to perform an operation. The operations of 805 may be performed in accordance with examples as disclosed herein. In some examples, aspects of the operations of 805 may be performed by a command component 625 as described with reference to FIG. 6.

At 810, the method may include receiving, from the memory system, a message including an availability parameter that indicates processing resources of the memory system that are available to perform the operation based at least in part on transmitting the command. The operations of 810 may be performed in accordance with examples as disclosed herein. In some examples, aspects of the operations of 810 may be performed by a message component 630 as described with reference to FIG. 6.

At 815, the method may include delaying transmission of one or more pending commands based at least in part on receiving the message including the availability parameter. The operations of 815 may be performed in accordance with examples as disclosed herein. In some examples, aspects of the operations of 815 may be performed by an availability component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for transmitting, to a memory system, a command to perform an operation; receiving, from the memory system, a message including an availability parameter that indicates processing resources of the memory system that are available to perform the operation based at least in part on transmitting the command; and delaying transmission of one or more pending commands based at least in part on receiving the message including the availability parameter.

Aspect 15: The method, apparatus, or non-transitory computer-readable medium of aspect 14, further including operations, features, circuitry, logic, means, or instructions, or any combination thereof for determining a priority of each command of the one or more pending commands based at least in part on receiving the message, where delaying the transmission of the one or more pending commands is based at least in part on determining the priority and transmitting a first pending command of the one or more pending commands after delaying the transmission based at least in part on determining the priority.

Aspect 16: The method, apparatus, or non-transitory computer-readable medium of any of aspects 14 through 15, where the availability parameter includes a score that indicates a percentage of bandwidth that the memory system has used to process incoming data that is stored in the memory system.

Aspect 17: The method, apparatus, or non-transitory computer-readable medium of any of aspects 14 through 16, further including operations, features, circuitry, logic, means, or instructions, or any combination thereof for transmitting, from the host system and to a second memory system, the command to perform the operation based at least in part on receiving the message and receiving, from the second memory system, a second message including a second availability parameter of the second memory system based at least in part on transmitting the command.

Aspect 18: The method, apparatus, or non-transitory computer-readable medium of any of aspects 14 through 17, further including operations, features, circuitry, logic, means, or instructions, or any combination thereof for receiving, from the memory system, a second indication that a register associated with the memory system has been changed based at least in part on receiving the message.

Aspect 19: The method, apparatus, or non-transitory computer-readable medium of aspect 18, further including operations, features, circuitry, logic, means, or instructions, or any combination thereof for transmitting, to the memory system, a second message requesting the memory system to transmit contents of the register associated with the memory system to the host system based at least in part on receiving the second indication.

Aspect 20: The method, apparatus, or non-transitory computer-readable medium of aspect 19, further including operations, features, circuitry, logic, means, or instructions, or any combination thereof for receiving, from the memory system, a third message that includes the contents of the register based at least in part on transmitting the second message.

Aspect 21: The method, apparatus, or non-transitory computer-readable medium of any of aspects 14 through 20, further including operations, features, circuitry, logic, means, or instructions, or any combination thereof for transmitting, to the memory system, a request for an indication of a health status of the memory system based at least in part on receiving the message and receiving, from the memory system, the indication of the health status of the memory system based at least in part on transmitting the request.

Aspect 22: The method, apparatus, or non-transitory computer-readable medium of any of aspects 14 through 21, further including operations, features, circuitry, logic, means, or instructions, or any combination thereof for determining an idle time for performing the operation based at least in part on receiving the message, where delaying the transmission is based at least in part on determining the idle time.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive a command to perform an operation;
determine an availability parameter that indicates processing resources of the memory system that are available to perform the operation based at least in part on receiving the command;
transmit, from the memory system, a message comprising the availability parameter based at least in part on determining the availability parameter;
enter, at the memory system, an idle time for performing the operation based at least in part on transmitting the message comprising the availability parameter; and
perform, at the memory system, the operation during the idle time based at least in part on entering the idle time.

2. The memory system of claim 1, wherein the processing circuitry is further configured to cause the memory system to:
determine an amount of available space to store data in a cache associated with writing to memory cells of the memory system that store three or fewer bits of information based at least in part on receiving the command, wherein determining the availability parameter is based at least in part on determining the amount of available space.

3. The memory system of claim 1, wherein the availability parameter comprises a score that indicates a percentage of bandwidth that the memory system has used to process incoming data that is stored in the memory system.

4. The memory system of claim 1, wherein the processing circuitry is further configured to cause the memory system to:
identify a second memory system available to receive the command to perform the operation based at least in part on determining the availability parameter; and
receive a second command to perform the operation at the second memory system based at least in part on identifying the second memory system.

5. The memory system of claim 4, wherein the processing circuitry is further configured to cause the memory system to:
determine a second availability parameter that indicates processing resources of the second memory system that are available to perform the operation based at least in part on receiving the command; and
transmit a second message comprising the second availability parameter based at least in part on determining the second availability parameter, wherein receiving the second command is based at least in part on transmitting the second message.

6. The memory system of claim 1, wherein the processing circuitry is further configured to cause the memory system to:
set, in a register associated with the memory system, a first indication of the availability parameter of the memory system based at least in part on determining the availability parameter; and
transmit a second indication that the register associated with the memory system has been changed based at least in part on setting the register, wherein transmitting the message is based at least in part on transmitting the second indication.

7. The memory system of claim 6, wherein the processing circuitry is further configured to cause the memory system to:
store parameter information about the operation of the memory system based at least in part on setting the first indication, wherein transmitting the second indication is based at least in part on storing the parameter information.

8. The memory system of claim 6, wherein the processing circuitry is further configured to cause the memory system to:
receive a second message requesting the memory system transmit contents of the register associated with the memory system to a host system, wherein transmitting the message comprising the availability parameter is based at least in part on receiving the second message.

9. The memory system of claim 8, wherein to transmit the message the processing circuitry is further configured to cause the memory system to:
transmit a third message that includes the contents of the register based at least in part on receiving the second message.

10. The memory system of claim 1, wherein the processing circuitry is further configured to cause the memory system to:
set in a register associated with the memory system, an indication of a health status of the memory system based at least in part on determining the availability parameter, wherein transmitting the message further comprises transmitting a descriptor that indicates the health status of the memory system based at least in part on setting the indication.

11. The memory system of claim 1, wherein a system comprises the memory system configured to manage memory-initiated operations and a second memory system configured to manage the memory-initiated operations.

12. The memory system of claim 1, wherein:
the operation comprises one or more host initiated operations, one or more memory system initiated operations, or a combination thereof;
the one or more host initiated operations comprise a read operation, a write operation, an erase operation, a trim operation, or a combination thereof; and
the one or more memory system initiated operations comprises a garbage collection operation, a flush operation, an error handling operation, a wear leveling operation, or a combination thereof.

13. A non-transitory computer-readable medium storing code comprising instructions which, when executed by processing circuitry of an electronic device, cause the electronic device to:
receive a command to perform an operation;

determine an availability parameter that indicates processing resources of a memory system that are available to perform the operation based at least in part on receiving the command;
transmit, from a memory system, a message comprising the availability parameter based at least in part on determining the availability parameter;
enter, at the memory system, an idle time for performing the operation based at least in part on transmitting the message comprising the availability parameter; and
perform, at the memory system, the operation during the idle time based at least in part on entering the idle time.

14. The non-transitory computer-readable medium of claim 13, wherein the instructions, when executed by the processing circuitry of the electronic device, further cause the electronic device to:
determine an amount of available space to store data in a cache associated with writing to memory cells of the memory system that store three or fewer bits of information based at least in part on receiving the command, wherein determining the availability parameter is based at least in part on determining the amount of available space.

15. The non-transitory computer-readable medium of claim 13, wherein the availability parameter comprises a score that indicates a percentage of bandwidth that the memory system has used to process incoming data that is stored in the memory system.

* * * * *